(12) United States Patent
Suganuma et al.

(10) Patent No.: US 12,236,371 B2
(45) Date of Patent: Feb. 25, 2025

(54) SERVER, RESERVATION MANAGEMENT SYSTEM, AND MANAGEMENT METHOD FOR ELECTRIC VEHICLE CHARGING STATION RESERVATIONS

(71) Applicant: TOYOTA JIDOSHA KABUSHIKI KAISHA, Toyota (JP)

(72) Inventors: Masami Suganuma, Miyoshi (JP); Hideki Tamoto, Toyota (JP); Masakazu Motohashi, Nagoya (JP); Akinori Morishima, Kanagawa-ken (JP); Taiki Miyazaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/490,308

(22) Filed: Oct. 19, 2023

(65) Prior Publication Data

US 2024/0185141 A1 Jun. 6, 2024

(30) Foreign Application Priority Data

Dec. 5, 2022 (JP) ................. 2022-194110

(51) Int. Cl.
*G06Q 10/02* (2012.01)
*G06Q 30/0601* (2023.01)
*G06Q 50/06* (2012.01)

(52) U.S. Cl.
CPC ......... *G06Q 10/02* (2013.01); *G06Q 30/0605* (2013.01); *G06Q 50/06* (2013.01)

(58) Field of Classification Search
CPC ........... G06Q 10/02; H02J 3/322; B60L 55/00
See application file for complete search history.

(56) References Cited

U.S. PATENT DOCUMENTS

2015/0046200 A1 2/2015 Chihara
2015/0283912 A1* 10/2015 Shimizu ................. B60L 55/00
320/157

(Continued)

FOREIGN PATENT DOCUMENTS

WO 2013/137071 A1 9/2013
WO WO-2015178158 A1 * 11/2015 .............. B60L 11/18

OTHER PUBLICATIONS

Xu, Minling, et al.; "Optimal Scheduling Strategy of Nano-Grid Considering Electric Vehicle Scheduled Discharge."; 2021; IEEE 16th Conference on Industrial Electronics and Applications (ICIEA), IEEE, 2021; pp. 1490-1494; https://doi.org/10.1109/ICIEA51954.2021.9516240. (Year: 2021).*

*Primary Examiner* — Rupangini Singh
*Assistant Examiner* — David G. Godbold
(74) *Attorney, Agent, or Firm* — Sughrue Mion, PLLC

(57) ABSTRACT

A server includes a communicator and a processor. The communicator is configured to receive a reservation request signal requesting a reservation to use a charging station by an electrified vehicle. The reservation request signal includes information indicating that balancing power control is requested, when the electrified vehicle wants to perform the balancing power control. The processor is configured to set, based on the reservation request signal, a reservation time period during which the electrified vehicle uses the charging station. The processor is configured to set the reservation time period to a longer period when the reservation request signal includes the information indicating that the balancing power control is requested than when the reservation request signal does not include the information indicating that the balancing power control is requested.

2 Claims, 6 Drawing Sheets

(56) References Cited

U.S. PATENT DOCUMENTS

| | | | |
|---|---|---|---|
| 2020/0384876 A1* | 12/2020 | Yokoyama | G06Q 50/40 |
| 2022/0009369 A1* | 1/2022 | Treadway | B60L 53/63 |
| 2023/0311700 A1* | 10/2023 | Shin | B60L 53/62 |
| | | | 320/109 |

* cited by examiner

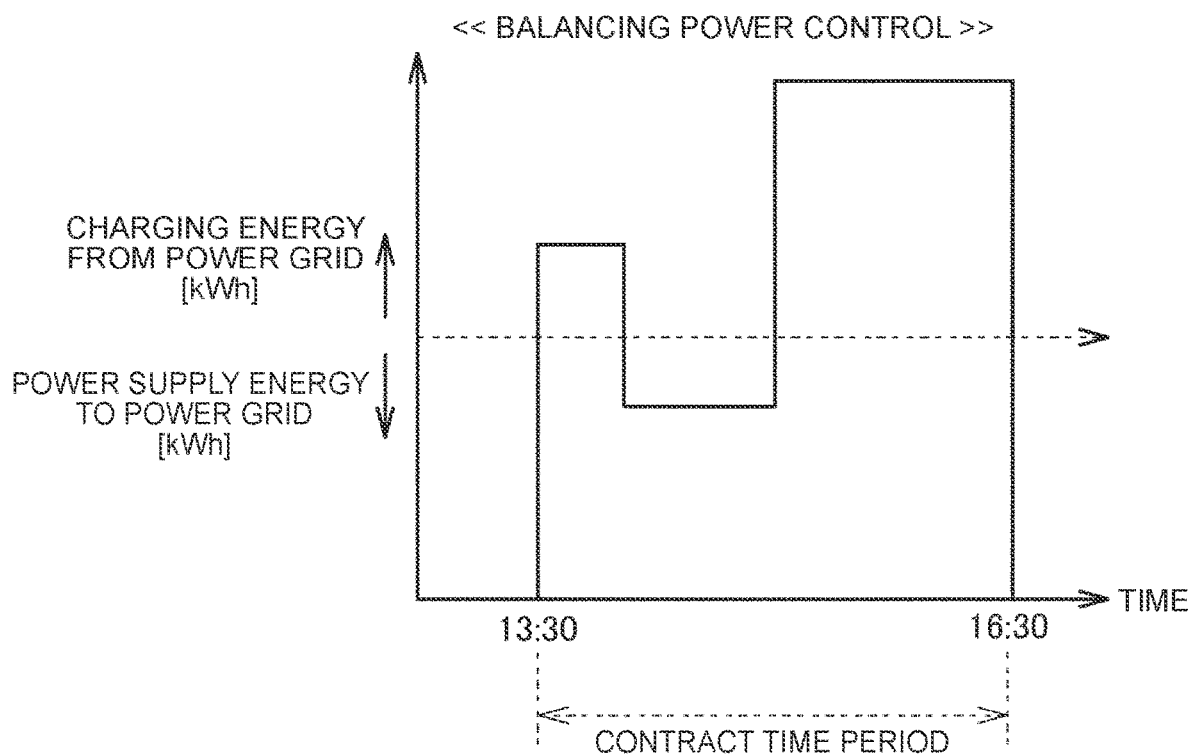

FIG. 4

<< CHARGING STATION REGISTRATION INFORMATION DB >>

132

| STATION ID | CHARGING STATION BASIC INFORMATION | NORMAL RESERVATION TIME PERIOD LENGTH | WHETHER BALANCING POWER CONTROL IS POSSIBLE | FIRST RESERVATION TIME PERIOD LENGTH | SECOND RESERVATION TIME PERIOD LENGTH |
|---|---|---|---|---|---|
| 1AX | PARKING A, STATION X, ... | 30 MIN | POSSIBLE | 4 HRS | 5 HRS |
| 1AY | PARKING A, STATION Y, ... | 30 MIN | POSSIBLE | 4 HRS | 5 HRS |
| 1AZ | PARKING A, STATION Z, ... | 20 MIN | POSSIBLE | 4 HRS | 5 HRS |
| ... | ... | ... | ... | ... | ... |

FIG. 5

<< CHARGING STATION RESERVATION INFORMATION DB >>
133

| TIME SLOT | STATION ID: 1AX | STATION ID: 1AY | STATION ID: 1AZ | ... |
|---|---|---|---|---|
| 2023/4/1 12:30-12:40 | AVAILABLE | RESERVED: USER ID **** | AVAILABLE | ... |
| 2023/4/1 12:40-12:50 | AVAILABLE | RESERVED: USER ID **** | AVAILABLE | ... |
| 2023/4/1 12:50-13:00 | AVAILABLE | AVAILABLE | AVAILABLE | ... |
| 2023/4/1 13:00-13:10 | AVAILABLE | AVAILABLE | ... | ... |
| ... | ... | ... | ... | ... |

SERVER, RESERVATION MANAGEMENT SYSTEM, AND MANAGEMENT METHOD FOR ELECTRIC VEHICLE CHARGING STATION RESERVATIONS

CROSS-REFERENCE TO RELATED APPLICATION

This application claims priority to Japanese Patent Application No. 2022-194110 filed on Dec. 5, 2022, incorporated herein by reference in its entirety.

BACKGROUND

1. Technical Field

The present disclosure relates to servers, reservation management systems, and management methods.

2. Description of Related Art

WO2013/137071 discloses a charger reservation system. This system includes a reservation processing unit and a required charging time calculation unit. The reservation processing unit receives a reservation registration for a charger, and manages reservation information including a start date and time and a tentative end date and time of the reservation. The required charging time calculation unit calculates the time required for charging when a user starts using the charger based on the reservation registration. The reservation processing unit calculates a new end date and time of the reservation based on the required time, and updates the tentative end date and time with the new end date and time.

SUMMARY

It is conceivable that an electrified vehicle uses a charging station (charger) connected to a power grid in order to perform power control in response to a balancing request from a supply and demand management server that manages the power supply and demand on the power grid, rather than to perform normal charging control. Therefore, for management of reservations for charging stations, it is required not only to improve the efficiency of utilization of the charging stations but also to make it easier to make a reservation for a charging station in order to respond to a request to balance the power supply and demand on the power grid.

The present disclosure makes it easier to make a reservation for a charging station in order to respond to a request to balance the power supply and demand on a power grid.

A server according to a first aspect of the present disclosure is configured to manage reservations for a charging station configured to be connected to an electrified vehicle. The electrified vehicle or the charging station is configured to perform balancing power control and normal charging control. The balancing power control is power control including at least one of power supply from the electrified vehicle to a power grid or charging from the power grid to the electrified vehicle according to a balancing request from a supply and demand management server configured to manage power supply and demand on the power grid. The normal charging control is power control for charging a battery of the electrified vehicle without the balancing request. The server includes a communicator and a processor. The communicator is configured to receive a reservation request signal requesting a reservation to use the charging station by the electrified vehicle. The reservation request signal includes information indicating that the balancing power control is requested, when the electrified vehicle wants to perform the balancing power control. The processor is configured to set, based on the reservation request signal, a reservation time period during which the electrified vehicle uses the charging station. The processor is configured to set the reservation time period to a longer period when the reservation request signal includes the information indicating that the balancing power control is requested than when the reservation request signal does not include the information indicating that the balancing power control is requested.

The server according to the first aspect of the present disclosure sets the reservation time period to a period long enough for the normal charging control, when the electrified vehicle does not plan to perform the balancing power control. This can improve the efficiency of utilization of the charging station. The electrified vehicle is required to perform the balancing power control for a relatively longer period of time than the normal charging control. According to the above configuration, when the electrified vehicle wants to perform the balancing power control, the server sets a longer reservation time period so that the balancing power control can be performed. The electrified vehicle can thus easily make a reservation for the charging station in order to respond to the request to balance the power supply and demand on the power grid.

In the server according to the first aspect of the present disclosure, the processor may be configured to, when the reservation request signal includes the information indicating that the balancing power control is requested, set the reservation time period based on the information in such a way that the reservation time period includes at least part of a time period during which the balancing power control is performed. According to the above configuration, it is further ensured that the electrified vehicle can perform the balancing power control when actually using the reserved charging station.

In the server according to the first aspect of the present disclosure, the electrified vehicle connected to the charging station or the charging station may be configured to perform the balancing power control including both the power supply from the electrified vehicle to the power grid and the charging from the power grid to the electrified vehicle. The processor may be configured to set the reservation time period to a longer period when the balancing power control includes both the power supply from the electrified vehicle to the power grid and the charging from the power grid to the electrified vehicle than when the balancing power control includes only the charging from the power grid to the electrified vehicle. This can encourage the use of the charging station by those electrified vehicles that can more flexibly respond to the request to balance the power supply and demand.

A reservation management system according to a second aspect of the present disclosure includes: an electrified vehicle equipped with a battery; a charging station configured to be connected to the electrified vehicle; and a server. The server is configured to manage reservations for the charging station, and includes a communicator and a processor. The electrified vehicle or the charging station is configured to perform balancing power control and normal charging control. The balancing power control is power control including at least one of power supply from the electrified vehicle to a power grid or charging from the power grid to the electrified vehicle according to a balancing request from a supply and demand management server configured to manage power supply and demand on the power grid. The normal charging control is power control for charging the battery without the balancing request. The communicator is configured to receive a reservation request signal requesting a reservation to use the charging station by the electrified vehicle. The reservation request signal includes information indicating that the balancing power control is requested, when the electrified vehicle wants to perform the balancing power control. The processor is configured to set, based on the reservation request signal, a reservation time period during which the electrified vehicle uses the charging station. The processor is configured to set the reservation time period to a longer period when the reservation request signal includes the information indicating that the balancing power control is requested than when the reservation request signal does not include the information indicating that the balancing power control is requested.

In the management system according to the second aspect of the present disclosure, the reservation time period is set to a period long enough for the normal charging control when the electrified vehicle does not plan to perform the balancing power control. This can improve the efficiency of utilization of the charging station. The electrified vehicle is required to perform the balancing power control for a relatively longer period of time than the normal charging control. According to the above configuration, when the electrified vehicle wants to perform the balancing power control, a longer reservation time period is set so that the balancing power control can be performed. The electrified vehicle can thus easily make a reservation for the charging station in order to respond to the request to balance the power supply and demand on the power grid.

A management method according to a third aspect of the present disclosure is performed by a server. The server is configured to manage reservations for a charging station configured to be connected to an electrified vehicle equipped with a battery. The electrified vehicle or the charging station is configured to perform balancing power control and normal charging control. The balancing power control is power control including at least one of power supply from the electrified vehicle to a power grid or charging from the power grid to the electrified vehicle according to a balancing request from a supply and demand management server configured to manage power supply and demand on the power grid. The normal charging control is power control for charging the battery without the balancing request. The management method includes: receiving a reservation request signal requesting a reservation to use the charging station by the electrified vehicle; setting, based on the reservation request signal, a reservation time period during which the electrified vehicle uses the charging station; and setting the reservation time period to a longer period when the reservation request signal includes information indicating that the balancing power control is requested than when the reservation request signal does not include the information indicating that the balancing power control is requested. The reservation request signal includes the information indicating that the balancing power control is requested, when the electrified vehicle wants to perform the balancing power control.

In the management method according to the third aspect of the present disclosure, the reservation time period is set to a period long enough for the normal charging control when the electrified vehicle does not plan to perform the balancing power control. This can improve the efficiency of utilization of the charging station. The electrified vehicle is required to perform the balancing power control for a relatively longer period of time than the normal charging control. According to the above configuration, when the electrified vehicle wants to perform the balancing power control, a longer reservation time period is set so that the balancing power control can be performed. The electrified vehicle can thus easily make a reservation for the charging station in order to respond to the request to balance the power supply and demand on the power grid.

According to the present disclosure, the electrified vehicle can easily makes a reservation for the charging station in order to respond to the request to balance the power supply and demand on the power grid.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 shows an example of contract information related to balancing power control;

FIG. 3 is a conceptual diagram showing an example of user registration information;

FIG. 4 is a conceptual diagram showing an example of charging station registration information;

FIG. 5 is a conceptual diagram showing an example of charging station reservation information;

DETAILED DESCRIPTION OF EMBODIMENTS

Hereinafter, embodiments of the present disclosure will be described in detail with reference to the drawings. The same or corresponding portions are denoted by the same signs throughout the drawings, and description thereof will not be repeated.

First Embodiment

Overall System Configuration

Figure 1:
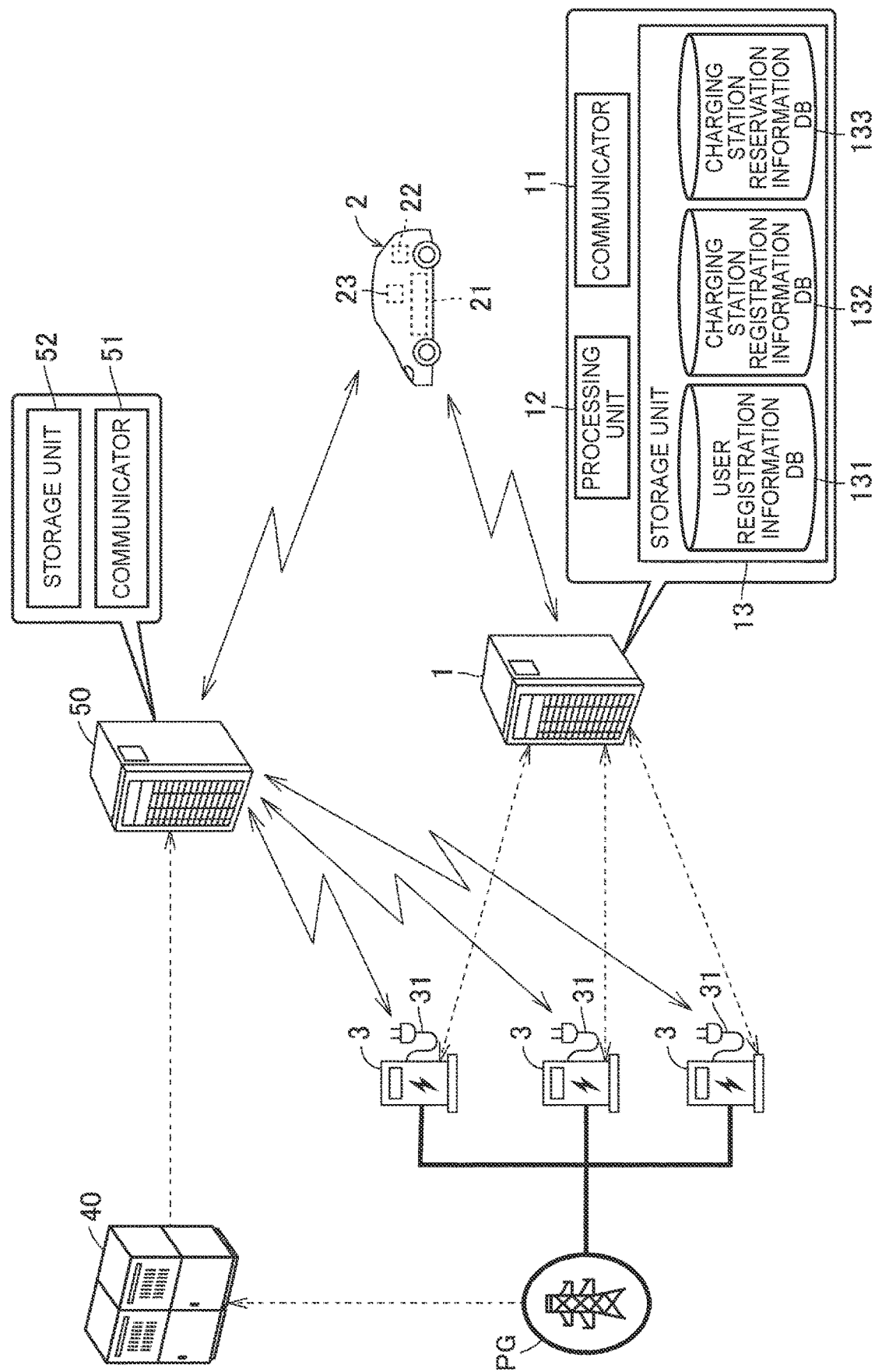
FIG. 1 shows a schematic configuration of a reservation management system according to a first embodiment of the present disclosure.

FIG. 1 shows a schematic configuration of a reservation management system according to a first embodiment of the present disclosure. The reservation management system includes a server 1, an electrified vehicle 2, and a plurality of charging stations 3.

The server 1 is a computer that is used to manage reservations for the charging stations 3. In the present embodiment, the server 1 may belong to, for example, a management company that manages the charging stations 3 and parking spaces for electrified vehicles that use the charging stations 3. The server 1 may belong to an energy company, an aggregator that will be described later, or other company (such as an automotive manufacturer). A detailed configuration of the server 1 and a reservation management method using the server 1 will be described later.

The electrified vehicle 2 is equipped with a battery 21. Examples of the electrified vehicle 2 include a plug-in hybrid electric vehicle (PHEV) and a battery electric vehicle (BEV). The electrified vehicle 2 is configured so that the battery 21 can be charged with power from a power grid PG when a charging cable 31 extending from the charging station 3 is connected to the electrified vehicle 2. The electrified vehicle 2 may be configured to supply power from the battery 21 to the power grid PG when the charging cable 31 is connected to the electrified vehicle 2.

The electrified vehicle 2 is configured to perform balancing power control and normal charging control. The balancing power control is power control including at least one of power supply from the electrified vehicle 2 to the power grid PG and charging from the power grid PG to the electrified vehicle 2 both of which are performed via, for example, the charging station 3 in response to a balancing request (that will be described later in detail) from a supply and demand management server 40 that manages the power supply and demand on the power grid PG. The normal charging control is normal power control for charging the battery 21 of the electrified vehicle 2 without the balancing request.

The electrified vehicle 2 further includes a communication device 22. The communication device 22 of the electrified vehicle 2 is configured to wirelessly communicate with the server 1 and a server 50 that will be described later. The communication device 22 of the electrified vehicle 2 may be configured to communicate via user equipment owned by a user of the electrified vehicle 2. The electrified vehicle 2 may include a touch display (not shown) that receives user input and displays and outputs various kinds of information for the user. User input to the electrified vehicle 2 may be received via the user equipment owned by the user.

Each of the charging stations 3 is configured to be connected to the electrified vehicle 2 via, for example, the charging cable 31. Each charging station 3 is configured so that the electrified vehicle 2 connected to the charging station 3 can perform charging of the electrified vehicle 2 (battery 21) with power from the power grid PG. In the present embodiment, each charging station 3 is configured so that the electrified vehicle 2 connected to the charging station 3 can perform the balancing power control via the charging station 3. The balancing power control may include both power supply from the electrified vehicle 2 to the power grid PG and charging from the power grid PG to the electrified vehicle 2.

Each charging station 3 may be configured to receive reservation information for the charging station 3 from the server 1 and, based on the reservation information, allow the electrified vehicle 2 connected to the charging station 3 to perform the power control of the electrified vehicle 2. In this case, when the electrified vehicle 2 is connected to the charging station 3 for which a reservation time period has been set in advance by the server 1, the power control (charging or power supply) of the electrified vehicle 2 can be performed within the reservation time period. The charging stations 3 are, for example, so-called electric vehicle supply equipment (EVSE). Each charging station 3 may be configured to perform the balancing power control and the normal charging control while connected to the electrified vehicle 2.

In the embodiment of the present disclosure, the power grid PG is an electrical network composed of power plants and power transmission and distribution facilities, neither of which is shown. In the present embodiment, an energy company serves as both a power producer and a power transmission and distribution operator. The energy company is a general power transmission and distribution operator, and maintains and manages the power grid PG. The energy company is a manager of the power grid PG.

The supply and demand management server 40 manages the power supply and demand on the power grid PG. The supply and demand management server 40 belongs to the energy company. The supply and demand management server 40 sends a request to balance the power demand on the power grid PG (balancing request) to the server 50 based on the power generation and consumption of each power balancing resource managed by the supply and demand management server 40. Specifically, when the power generation or power consumption of the power balancing resources is expected to be larger than usual (or is currently larger than usual), the supply and demand management server 40 sends a request to increase or reduce the power demand more than usual to the server 50.

The server 50 is a server managed by an aggregator. An aggregator is an electric utility that bundles a plurality of power balancing resources in an area, a predetermined facility, etc. to provide an energy management service.

In order to increase or reduce the power demand on the power grid PG, the server 50 requests (asks) the electrified vehicle 2 to perform the balancing power control according to the balancing request. Specifically, a communicator 51 of the server 50 sends a request signal according to the balancing request to the electrified vehicle 2.

A predetermined contract (arrangement) is made between the server 50 and the electrified vehicle 2 regarding the balancing power control. Specifically, the contract includes information on the place where the balancing power control is performed. The contract further includes agreements on the charging energy and/or the power supply energy and on the charging time and/or the power supply time. The contract further includes an agreement on the time period during which the balancing power control is performed. Hereinafter, this time period is sometimes referred to as "contract time period." The above information related to the contract is stored in, for example, a memory of an electronic control unit (ECU) 23 of the electrified vehicle 2.

FIG. 2 shows an example of the contract information related to the balancing power control. In FIG. 2, the abscissa represents time, and the ordinate represents the charging energy or the power supply energy in the balancing power control at each point in time. As shown in FIG. 2, the contract information includes information indicating the contract time period. It is preferable that the total charging energy from the power grid be larger than the total power supply energy to the power grid during the contract time period.

The server 50 is configured to manage information on each registered electrified vehicle 2 (hereinafter also referred to as "vehicle information"), information on each registered user (hereinafter also referred to as "user information"), and information on each registered charging station 3 configured to perform the balancing power control (hereinafter also referred to as "charging station information"). The user information and the vehicle information are distinguished by identification information (ID) and stored in a storage unit 52 of the server 50.

A user ID is identification information for identifying a user, and also serves as information for identifying user equipment owned by the user. The server 50 is configured to distinguish and save information received from pieces of user equipment by the user IDs. The user information includes a communication address of the user equipment owned by the user, and a vehicle ID of the electrified vehicle 2 belonging to the user. The vehicle ID is identification information for identifying an electrified vehicle 2. The vehicle ID may be a license plate number or may be a vehicle identification number (VIN).

A charging station ID is identification information for identifying a charging station 3. A communication address of the charging station 3 and identification information for identifying the electrified vehicle 2 connected to the charging station 3 are saved in the charging station information that is sent and received to and from the server 50.

Server Configuration

Next, the configuration of the server 1 will be described. The server 1 includes a communicator 11, a processing unit 12, and a storage unit 13. The communicator 11 is configured to communicate bidirectionally with the electrified vehicle 2. The communicator 11 is configured to receive, for example, a reservation request signal (that will be described in detail later) requesting a reservation to use the charging station 3 by the electrified vehicle 2.

The processing unit 12 is an arithmetic processing unit such as a central processing unit (CPU) or a micro-processing unit (MPU). The storage unit 13 includes, as a memory, a volatile memory such as a random access memory (RAM), and includes, as a storage, a rewritable nonvolatile memory such as a hard disk drive (HDD), a solid state drive (SSD), and a flash memory. The storage stores system programs including an operating system (OS) and control programs including computer-readable codes necessary for arithmetic processing. The processing unit 12 implements various processes by reading the system programs and the control programs, loading them into the memory of the storage unit 13, and executing them.

The storage unit 13 (storage) includes a plurality of databases 131, 132, and 133. User registration information, charging station registration information, and charging station reservation information are stored in the databases.

FIG. 3 is a conceptual diagram showing an example of the user registration information. As shown in FIG. 3, the user registration information includes user information registered by each user who uses the reservation management system of the present embodiment. The user registration information includes, for example, a user ID, a vehicle ID associating a user with a vehicle, and vehicle model information of the vehicle ID.

The user information is registered in advance according to a user operation received by the electrified vehicle 2 or the user equipment owned by the user of the electrified vehicle 2. The registered content is sent from the electrified vehicle 2 or the user equipment to the server 1 and stored in the user registration information database 131.

FIG. 4 is a conceptual diagram showing an example of the charging station registration information. As shown in FIG. 4, the charging station registration information includes information on the charging stations 3 for which the server 1 can set a reservation to use by the electrified vehicle 2. The charging stations 3 for which the server 1 can set a reservation are registered in advance in the server 1. The charging station registration information includes information indicating a station ID, charging station basic information, a normal reservation time period length, information on whether the balancing power control is possible, a first reservation time period length, and a second reservation time period length. These pieces of information are distinguished for each charging station 3 and stored in the charging station registration information database 132.

The station ID is identification information for identifying an individual charging station 3. The charging station basic information includes name information of each charging station 3 displayed for the user to identify an individual charging station 3, location information of each charging station 3, and information indicating the maximum power value for charging from the power grid PG to the electrified vehicle 2 via each charging station 3. The charging station basic information may include information indicating the maximum power value for power supply from the electrified vehicle 2 to the power grid PG.

The normal reservation time period length is the length of the time period during which the charging station 3 can be reserved in the case where the way the user wants to use the charging station 3 at the time of making a reservation does not include the balancing power control by the electrified vehicle 2 and includes only charging from the power grid PG to the electrified vehicle 2. The normal reservation time period length will be described in detail later.

The information on whether the balancing power control is possible is information indicating whether the electrified vehicle 2 connected to the charging station 3 can perform the balancing power control via the charging station 3.

The first reservation time period length is the length of the time period during which the charging station 3 can be reserved in the case where the way the user wants to use the charging station 3 at the time of making a reservation is a predetermined condition. The predetermined condition is that the way the user wants to use the charging station 3 includes the balancing power control by the electrified vehicle 2 and the balancing power control includes charging from the power grid PG to the electrified vehicle 2 but does not include power supply from the electrified vehicle 2 to the power grid PG. The first reservation time period length is set in advance for each charging station 3 to a value larger than the normal reservation time period length.

The second reservation time period length is the length of the time period during which the charging station 3 can be reserved in the case where the way the user wants to use the charging station 3 at the time of making a reservation is a predetermined condition. The predetermined condition is that the way the user wants to use the charging station 3 includes the balancing power control by the electrified vehicle 2 and the balancing power control includes power supply from the electrified vehicle 2 to the power grid PG. The second reservation time period length is set for each charging station 3 to a value larger than the first reservation time period length.

In the present embodiment, the normal reservation time period length, the first reservation time period length, and the second reservation time period length are set to fixed values for each registered charging station 3 in the storage unit 13 (charging station registration information database 132) of the server 1.

However, these time period lengths may be set to calculated values calculated based on a predetermined algorithm by a program stored in the processing unit 12. In the case where these time period lengths are set to calculated values, these time period lengths may be calculated based on, for example, the maximum power value of the charging station 3 during charging from the power grid PG to the electrified vehicle 2.

In the present embodiment, it is preferable that each of the first and second reservation time period lengths be set to a value sufficiently larger than the length of the time period during which the balancing power control is performed (contract time period). For example, in the case where the first reservation time period length and the second reservation time period length are set to fixed values, each of the first and second reservation time period lengths is preferably set to a value sufficiently larger than the typical length (e.g., about three hours) of the time period during which the balancing power control is performed. In the case where the first reservation time period length and the second reservation time period length are set to calculated values, the first and second reservation time period lengths may be the values calculated based on information indicating that there is a request for the balancing power control received from the electrified vehicle 2 (contract information). For example, the first and second reservation time period lengths may be calculated by adding a predetermined time period length to the length of the time period during which the balancing power control is performed (contract time period length).

FIG. 5 is a conceptual diagram showing an example of the charging station reservation information. As shown in FIG. 5, reservation information of each charging station 3 for each time slot of a predetermined length (or each point in time) is registered in the charging station reservation information. This information is stored in the charging station reservation information database 133. The server 1 can check reservation availability information of each charging station 3 by referring to the charging station reservation information database 133.

Method for Managing Reservations for Charging Stations

Figure 6:
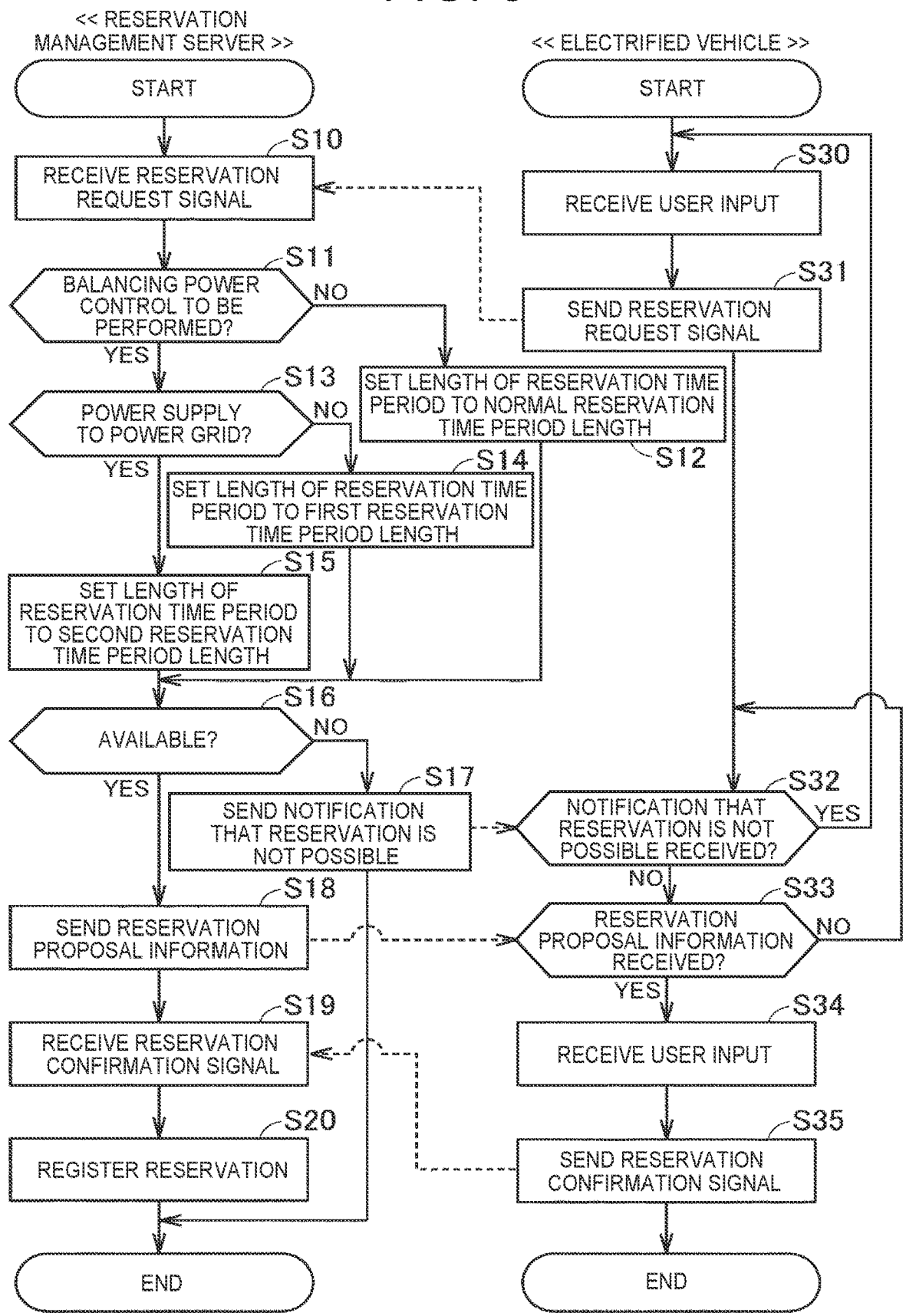
FIG. 6 is a flowchart showing the flow of a process that is performed by a server and an electrified vehicle according to the embodiment of the present disclosure.

Next, a method for managing reservations for charging stations will be described with reference to the flowchart of FIG. 6. FIG. 6 is a flowchart showing the flow of a process that is performed by the server and the electrified vehicle according to the embodiment of the present disclosure.

As shown in FIG. 6, the electrified vehicle 2 first receives user input (step S30). The electrified vehicle 2 may receive user input via the user equipment owned by the user of the electrified vehicle 2 in step S30. Instead of the electrified vehicle 2, the user equipment may receive user input. The process (steps S31 to S35) that is performed by the electrified vehicle 2, which will be described later, may also be performed by the user equipment owned by the user of the electrified vehicle 2.

The information that is input includes information indicating the desired time to start using the charging station 3, information indicating the desired place to use the charging station 3, and information indicating the way to use the charging station 3. The information indicating the desired place to use the charging station 3 may be, for example, information indicating a building such as a parking lot or a commercial facility where the charging station 3 is installed, information indicating an area, or information directly indicating a specific charging station 3.

In the present embodiment, the information indicating the way to use the charging station 3 includes at least information indicating that the normal charging control is requested or information indicating that the balancing power control is requested.

The electrified vehicle 2 then sends a reservation request signal to the server 1 (step S31). The electrified vehicle 2 may send a reservation request signal to the server 1 via the user equipment. The server 1 receives the reservation request signal (step S10). The reservation request signal includes the following information entered by the user: information indicating the desired time to start using the charging station 3, information indicating the desired place to use the charging station 3, and information indicating the way to use the charging station 3.

In the case where the information indicating the way to use the charging station 3 includes information indicating that the balancing power control is requested, this information indicating that the balancing power control is requested may further include predetermined contract information related to the balancing power control (see FIG. 2) that is stored in the memory of the ECU 23 of the electrified vehicle 2. The contract information indicates whether the contracted balancing power control includes charging from the power grid PG to the electrified vehicle 2, and whether the contracted balancing power control includes power supply from the electrified vehicle 2 to the power grid PG. In the example shown in FIG. 2, the balancing power control includes both charging from the power grid PG to the electrified vehicle 2 and power supply from the electrified vehicle 2 to the power grid PG.

Subsequently, the server 1 (processing unit 12) determines whether the received reservation request signal includes information indicating that the balancing power control is requested (step S11). When the received reservation request signal does not include information indicating that the balancing power control is requested (NO in step S11), the length of the reservation time period for the charging station 3 is set to the normal reservation time period length described above (step S12). In the present embodiment, when the information indicating the way to use the charging station 3 is information indicating that the normal charging control is requested, the reservation request signal does not include information indicating that the balancing power control is requested.

When the received reservation request signal includes information indicating that the balancing power control is requested (YES in step S11), the server 1 (processing unit 12) acquires the contract information related to the balancing power control from the electrified vehicle 2 at the same time as or after acquiring the information that the balancing power control is requested. Based on the acquired contract information, the server 1 (processing unit 12) further determines whether the balancing power control includes power supply from the electrified vehicle 2 to the power grid PG in addition to charging from the power grid PG to the electrified vehicle 2 (step S13).

When the balancing power control includes charging from the power grid PG to the electrified vehicle 2 but does not include power supply from the electrified vehicle 2 to the power grid PG (NO in step S13), the length of the reservation time period for the charging station 3 is set to the first reservation time period length described above (step S14). In the present embodiment, a plurality of charging stations 3 for which the first reservation time period length is set to a value larger than the normal reservation time period length is registered in the charging station registration information database 132 (see FIG. 4).

When the balancing power control includes both charging from the power grid PG to the electrified vehicle 2 and power supply from the electrified vehicle 2 to the power grid PG (YES in step S13), the server 1 (processing unit 12) sets the length of the reservation time period for the charging station 3 to the second reservation time period length described above (step S15). In the present embodiment, a plurality of charging stations 3 for which the second reservation time period length is set to a value larger than the first reservation time period length is registered in the charging station registration information database 132 (see FIG. 4).

As described above, in steps S12 to S15, namely before registering a reservation for the charging station 3, the processing unit 12 of the server 1 sets a reservation time period during which the electrified vehicle 2 uses the charging station 3, based on the reservation request signal. After the process that will be described later, a reservation having this reservation time period length can be registered in the end.

As described above, the first reservation time period length and the second reservation time period length are longer than the normal reservation time period length. In other words, the reservation time period is set to a longer period when the reservation request signal includes information indicating that the balancing power control is requested than when the reservation request signal does not includes information indicating that the balancing power control is requested. Therefore, when the electrified vehicle 2 wants to perform the balancing power control, the server 1 sets a longer reservation time period so that the balancing power control can be performed. The electrified vehicle 2 can thus easily make a reservation for the charging station 3 in order to respond to the request to balance the power supply and demand on the power grid PG. Moreover, the convenience for the user of the electrified vehicle 2 who intends to perform the balancing power control is improved because a longer reservation time period can be set.

As described above, the second reservation time period length is longer than the first reservation time period length. That is, the reservation time period is set to a longer period when the balancing power control includes both charging from the power grid PG to the electrified vehicle 2 and power supply from the electrified vehicle 2 to the power grid PG than when the balancing power control includes only charging from the power grid PG to the electrified vehicle 2. This can encourage the use of the charging stations 3 by those electrified vehicles 2 that can more flexibly respond to a request to balance the power supply and demand. Moreover, the convenience for the user of the electrified vehicle 2 who intends to perform the balancing power control is improved because a longer reservation time period can be set.

Subsequently, the server 1 determines based on the received reservation request signal whether any of the charging stations 3 is available (step S16). First, the server 1 determines whether there is any available charging station 3, based on the information included in the reservation request signal (specifically, the desired reservation start time), the length of the reservation time period set as described above, and the information stored in the charging station reservation information database 133 (see FIG. 5) and indicating the availability of each charging station 3.

In the case where the reservation request signal includes information indicating that the balancing power control is requested, the server 1 determines whether the time period from the desired reservation start time to the time when the reservation time period elapses (i.e., the reservation time period) overlaps the contract time period (time period during which the balancing power control is performed). At this time, it is more preferable to determine whether the entire contract time period is included in the reservation time period.

When there is no available charging station 3 and/or when the reservation time period does not overlap the contract time period, the server 1 determines that it is not possible to reserve any charging station 3 (NO in step S16), and sends to the electrified vehicle 2 a notification that reservation is not possible (step S17). On the other hand, when there is any available charging station 3 (and the reservation time period overlaps part or the entire contract time period) and reservation is possible (YES in step S16), the server 1 sends reservation proposal information to the electrified vehicle 2 (step S18). The reservation proposal information includes information indicating one or more charging stations 3 that are available for the set reservation time period by the user's desired way to use the charging station 3 and information indicating the reservation time period of each of these charging stations 3 starting from the reservation start time.

In the present embodiment, when the reservation request signal includes information indicating that the balancing power control is requested, steps S16 to S18 and a process that will be described later are performed to set the reservation time period based on this information in such a way that the reservation time period includes at least part of a time period during which the balancing power control is performed. This further ensures that the electrified vehicle 2 can perform the balancing power control when actually using the reserved charging station 3.

After sending the reservation request signal (step S31), the electrified vehicle 2 determines whether it has received from the server 1 the notification that there is no available charging station 3 (step S32). When the electrified vehicle 2 has received this notification (YES in step S32), the process returns to step S30 and the electrified vehicle 2 receives user input that is necessary for the server 1 to propose any available charging station 3.

When the electrified vehicle 2 has not received this notification (NO in step S32), the electrified vehicle 2 determines whether it has received the reservation proposal information (step S33). When the electrified vehicle 2 has not received the reservation proposal information (NO in step S33), the process returns to step S32. When the electrified vehicle 2 has received the reservation proposal information from the server 1 (YES in step S33), the electrified vehicle 2 further receives user input (step S34). Specifically, the electrified vehicle 2 selects the charging station 3 the user actually wants to reserve from the available charging stations 3 included in the reservation proposal information, and receives input of information for confirming a reservation.

In step S34, the electrified vehicle 2 may receive input of information for modifying the reservation time period set in steps S11 to S15. This modification is preferably a modification to bring forward the end time of the reservation time period. This further improves the convenience for the user of the electrified vehicle 2.

The electrified vehicle 2 then sends a reservation confirmation signal to the server 1 (step S35). The reservation confirmation signal includes information indicating the charging station 3 the user actually wants to reserve and the reservation time period set for this charging station 3 (or the modified reservation time period described above). When the server 1 receives the reservation confirmation signal (step S19), the server 1 registers reservation information in the charging station reservation information database 133 of the storage unit 13 based on the information included in the reservation confirmation signal (step S20).

After registering the reservation (step S20), the server 1 may send to the electrified vehicle 2 a notification that the reservation has been registered. In the case where the registered reservation is a reservation for the electrified vehicle 2 to perform the balancing power control, the notification that is sent to the electrified vehicle 2 may include incentive information. The incentive information is, for example, information indicating a reward the user can receive when the electrified vehicle 2 performs the balancing power control using the charging station 3 according to the reservation. This further ensures that the balancing power control can be performed by the electrified vehicle 2.

Reservations for the charging stations 3 are managed in this manner. In the present embodiment, the reservation time period is set to a longer period when the reservation request signal includes information indicating that the balancing power control is requested than when the reservation request signal does not include information indicating that the balancing power control is requested. This makes it easier to make a reservation for the charging station 3 in order to respond to a request to balance the power supply and demand on the power grid PG.

Second Embodiment

Hereinafter, a second embodiment of the present disclosure will be described with reference to the drawings. The second embodiment of the present disclosure is mainly different from the first embodiment of the present disclosure in system configuration. Therefore, the same configurations as those of the first embodiment will not be repeated.

Figure 7:
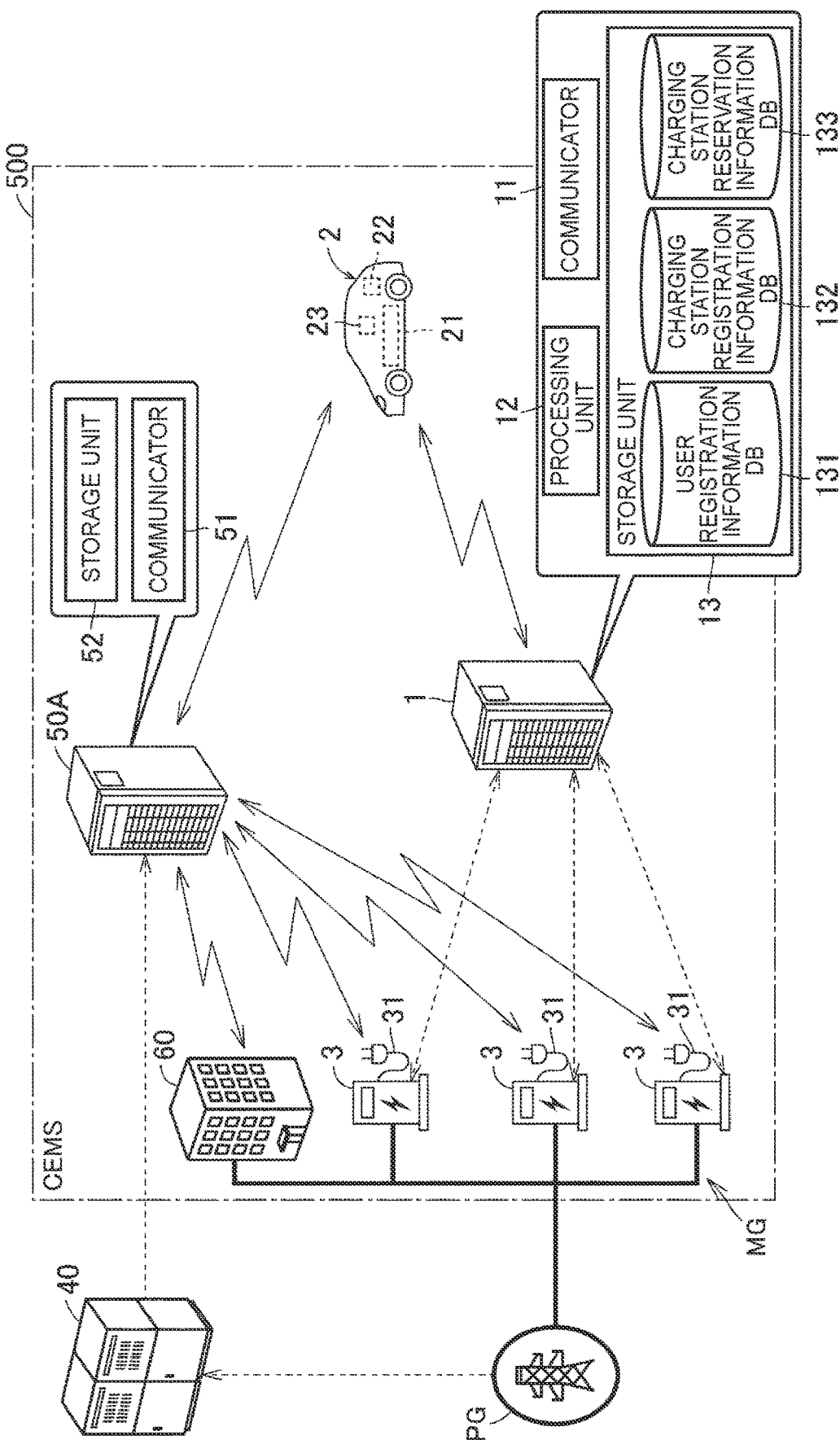
FIG. 7 shows a schematic configuration of a reservation management system according to a second embodiment of the present disclosure.

FIG. 7 shows a schematic configuration of a reservation management system according to the second embodiment of the present disclosure. In the second embodiment of the present disclosure, a server 50A is a CEMS server. The server 50A is a computer that manages power balancing resources in a CEMS 500. The term "CEMS" means a community energy management system or a city energy management system.

The CEMS 500 includes the charging stations 3 and the electrified vehicle 2 as power balancing resources. The CEMS 500 further includes a building energy management system (BEMS) as a power balancing resource. The BEMS is a system that manages the supply and demand of power that is used in buildings such as offices, commercial facilities, and accommodations. The charging stations 3 may be installed in the premises of an owner of a building whose power supply and demand are managed by the BEMS.

Although not shown in the figure, the CEMS 500 may include a factory energy management system (FEMS) and a home energy management system (HEMS) as power balancing resources, or may include other power balancing resources such as a generator, a variable renewable energy source, and an energy storage system. In the CEMS 500, these components form a microgrid MG.

Therefore, in the present embodiment, each charging station 3 is configured so that the electrified vehicle 2 connected to the charging station 3 can perform charging of the electrified vehicle 2 (battery 21) with power from the microgrid MG of the power grid PG. Each charging station 3 is also configured so that, when the electrified vehicle 2 is connected to the charging station 3, the electrified vehicle 2 (battery 21) can supply power to the microgrid MG of the power grid PG.

In the present embodiment, the server 50A that is a CEMS server receives a request to balance the power demand on the power grid PG from the supply and demand management server 40. The server 50A that is a CEMS server then sends to the electrified vehicle 2 a request signal according to the request to balance the power demand (balancing request), based on the power consumption (and power generation) of the power balancing resources such as a BEMS 60 and the charging stations 3 in the CEMS 500.

The server 50A and the electrified vehicle 2 are configured to perform the same process as that performed by the server 50 and the electrified vehicle 2 in the first embodiment (process shown in FIG. 6). The incentive information that can be included in the notification to be sent to the electrified vehicle 2 after the reservation is registered (step S20) may be, for example, information on a discount coupon for the usage fee for a commercial facility or accommodation related to the BEMS 60.

In the present embodiment as well, the reservation time period is set to a longer period when the reservation request signal includes information indicating that the balancing power control is requested than when the reservation request signal does not include information indicating that the balancing power control is requested. This makes it easier to make a reservation for the charging station 3 in order to respond to a request to balance the power supply and demand on the power grid PG.

The embodiments disclosed herein should be considered to be illustrative in all respects and not restrictive. The scope of the present disclosure is shown by the claims rather than by the above description of the embodiments, and is intended to include all modifications within the meaning and scope equivalent to the claims.

What is claimed is:

1. A reservation management system comprising:
an electrified vehicle equipped with a battery;
a charging station configured to be connected to the electrified vehicle;
a first server configured to manage reservations for the charging station, and including a communicator that communicates with the electrified vehicle and a processor that controls the charging station; and
a supply and demand management server configured to manage power supply and demand on a power grid, wherein
the electrified vehicle or the charging station is configured to perform balancing power control and normal charging control, the balancing power control being power control including at least one of power supply from the electrified vehicle to a power grid or charging from the power grid to the electrified vehicle according to a balancing request from the supply and demand management server, and the normal charging control being power control for charging the battery without the balancing request,
the communicator is configured to receive a reservation request signal requesting a reservation to use the charging station by the electrified vehicle, the reservation request signal including information indicating that the balancing power control is requested when the electrified vehicle wants to perform the balancing power control,
the processor is configured to set, based on the reservation request signal, a reservation time period during which the electrified vehicle uses the charging station, wherein the reservation time period is set to a longer period when the reservation request signal includes the information indicating that the balancing power control is requested than when the reservation request signal does not include the information indicating that the balancing power control is requested,
wherein based upon the supply and demand management server determining that a power consumption of power balancing resources is expected to be larger than a predetermined value, the supply and demand management server sends the balancing request to the processor, and
based upon the processor receiving the balancing request from the supply and demand management server, the processor controls the charging station to cause the electrified vehicle to supply power from the electrified vehicle to the power grid during at least a part of a time of the reservation time period.

2. A management method that is performed by a first server, the server being configured to manage reservations for a charging station configured to be connected to an electrified vehicle equipped with a battery, wherein the first server includes a communicator that communicates with the electrified vehicle and a processor that controls the charging station, the electrified vehicle or the charging station being configured to perform balancing power control and normal charging control, the balancing power control being power control including at least one of power supply from the electrified vehicle to a power grid or charging from the power grid to the electrified vehicle according to a balancing request from a supply and demand management server configured to manage power supply and demand on the power grid, and the normal charging control being power control for charging the battery without the balancing request, the management method comprising:

receiving a reservation request signal requesting a reservation to use the charging station by the electrified vehicle, the reservation request signal including information indicating that the balancing power control is requested, when the electrified vehicle wants to perform the balancing power control;

setting, based on the reservation request signal, a reservation time period during which the electrified vehicle uses the charging station, wherein the reservation time period is set to a longer period when the reservation request signal includes the information indicating that the balancing power control is requested than when the reservation request signal does not include the information indicating that the balancing power control is requested, wherein based upon the supply and demand management server determining that a power consumption of power balancing resources is expected to be larger than a predetermined value, sending the balancing request to the processor, and based upon the processor receiving the balancing request from the supply and demand management server, controlling the charging station to cause the electrified vehicle to supply power from the electrified vehicle to the power grid during at least a part of a time of the reservation time period.

\* \* \* \* \*